United States Patent
Ikeda et al.

(10) Patent No.: US 8,926,430 B1
(45) Date of Patent: Jan. 6, 2015

(54) GAME SYSTEM, GAME PROGRAM, AND METHOD FOR PROVIDING GAME SWITCHABLE BETWEEN MANUAL MODE AND AUTOMATIC MODE

(71) Applicant: DeNA Co., Ltd., Tokyo (JP)

(72) Inventors: Ryuji Ikeda, Tokyo (JP); Kenichi Iwao, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/079,576

(22) Filed: Nov. 13, 2013

(30) Foreign Application Priority Data

Oct. 10, 2013 (JP) ................... 2013-213133

(51) Int. Cl.
- A63F 13/10 (2006.01)
- A63F 13/40 (2014.01)
- A63F 13/30 (2014.01)

(52) U.S. Cl.
CPC .............. *A63F 13/10* (2013.01); *A63F 13/12* (2013.01)
USPC ............................................. 463/31

(58) Field of Classification Search
USPC ............................................. 463/31
See application file for complete search history.

(56) References Cited

U.S. PATENT DOCUMENTS 5,896,125 A * 4/1999 Niedzwiecki ................. 345/168

FOREIGN PATENT DOCUMENTS

JP 2005-318987 11/2005

OTHER PUBLICATIONS

Statement of Certificate of Exception to Lack of Novelty for Japanese Patent Application No. 2013-213133 dated Oct. 29, 2013.

* cited by examiner

*Primary Examiner* — Pierre E Elisca
(74) *Attorney, Agent, or Firm* — Pillsbury Winthrop Shaw Pittman LLP

(57) ABSTRACT

A game system according to an embodiment of the present invention provides a game, the game system comprising one or more processors to execute a game program, wherein a plurality of player units battle with a plurality of non-player units in either manual mode or automatic mode. The manual mode and automatic mode can be selected in accordance with first and second operations on a control object. In manual mode, a battle process is performed in accordance with a third operation on the control object.

12 Claims, 5 Drawing Sheets

GAME SYSTEM, GAME PROGRAM, AND METHOD FOR PROVIDING GAME SWITCHABLE BETWEEN MANUAL MODE AND AUTOMATIC MODE

TECHNICAL FIELD

Cross-Reference to Related Applications

This application is based on and claims the benefit of priority from Japanese Patent Application Serial No. 2013-213133 (filed on Oct. 10, 2013), the contents of which are hereby incorporated by reference in their entirety.

The disclosure herein is related to a game system, a game program, and a method for providing a game switchable between manual mode and automatic mode and, in particular, to a game system, a game program, and a method for providing a game whose mode is switchable between manual mode and automatic mode, wherein a plurality of player units battle with a plurality of non-player units.

BACKGROUND

There are known games wherein a plurality of player units operated based on instructions from players battle with a plurality of non-player units operated by a computer. Such battle games include various games such as strategic simulation games, sports game, and role playing games.

Some of these battle games employ automatic mode (also called automatic mode, automatic battle, automatic control, etc.) where the game progresses without instructions from a player such that the trouble of giving detailed instructions to the plurality of player units can be eliminated. The players can play the games in a desired mode selected from automatic mode and manual mode in accordance with the situation. Such a battle game switchable between automatic mode and manual mode is disclosed in Japanese Patent Application Publication No. 2005-318987 (Patent Literature 1).

RELEVANT REFERENCES

List of Relevant Patent Literature

Patent Literature 1: Japanese Patent Application Publication No. 2005-318987

SUMMARY

Meanwhile, the mainstream of terminals for playing games has transitioned from game consoles to general-purpose mobile terminals such as smartphones. Users of general-purpose mobile terminals often play games in short vacant periods in their daily life as they use emails and SNS services. For example, in most cases, they confirm the situation of a battle in a battle game or input an instruction to a player unit in a short vacant period.

Such users frequently switch the games between manual mode and automatic mode. For example, they play the game in manual mode at home, set the game to automatic mode to progress the game when they leave their home, then set the game back to the manual mode on trains to give necessary instructions to the player unit, and switch the game again to automatic mode. Accordingly, it is preferable that the switching between manual mode and automatic mode can be done through a simple operation.

However, since the mainstream of play styles used to be long period game play using a game console, there was no need of frequently switching the game between manual mode and automatic mode. Therefore, there is no known technique for switching between two modes through a simple operation. The switching between manual mode and automatic mode conventionally requires convex operations by players. For example, Patent Literature 1 discloses that a player presses START button of the controller to open a menu, selects setting of automatic mode to ON/OFF in this menu by operating direction keys, and confirm the selection of the mode by pressing the X button of the controller, thereby to transition to the selected mode (see paragraphs [0046] to [0048] of Patent Literature 1).

Thus, the switching between manual mode and automatic mode conventionally requires convex operations. The switching to automatic mode is intended to reduce troublesome operations of instructions to a player unit; therefore, it is required to enable simple operation of switching to automatic mode.

To overcome the above problem, one object of the present invention is to provide a game system, a game program, and a method for providing a game that can be switched between manual mode and automatic mode through a simple operation. Other objects of the present disclosure will be apparent with reference to the entire description in this specification.

A game system according to an embodiment of the present invention provides a game, the game system comprising one or more processors to execute a game program, wherein a plurality of player units battle with a plurality of non-player units in either manual mode or automatic mode. Herein, "automatic mode" refers to a mode where a battle can be progressed based on operations of a player unit by a computer without any instruction from a player; and "manual mode" refers to a mode where a battle is progressed based on instructions from the player. In automatic mode for example, the actions (movement, an attack on a non-player unit, and use of an item) of a player unit are determined based on a predetermined logic even if the player gives no instruction to the player unit. By contrast, in manual mode, actions of the player unit are determined based on instructions from the player, and a battle process is performed based on the actions of the player unit based on the instructions from the player. For example, when the player instructs a particular player unit to attack another unit, the player unit attacks the other unit in accordance with the instruction.

A game program according to an embodiment of the present invention comprises a display module configured to display a control object on a touch screen provided to the client terminal. The control object can be displayed on a touch screen in either manual mode or automatic mode. In an embodiment, the control object is displayed at the same position on the touch screen in both manual mode and automatic mode. In automatic mode, this control object may be displayed in such a manner as to indicate that the game is in automatic mode. For example, the control object displayed in automatic mode may include characters "AUTO," "Auto," or "automatic" indicating that the game is in automatic mode.

The manual mode and automatic mode can be selected in accordance with operation on the above control object by the player. A game program according to an embodiment of the present invention comprises a transition module configured to switch a game from the manual mode to the automatic mode when a first operation is performed on the control object in the manual mode and configured to switch the game from the automatic mode to the manual mode when a second operation is performed on the control object in the automatic mode. The mode transition module enables switching of the game between manual mode and automatic mode. Thus, in an embodiment of the present invention, the switching between manual mode and automatic mode can be readily done only by operating the one control object. Particularly when the control object is displayed at the same position both in manual mode and control mode, the operation for switching the mode can always be done at the same position on the touch panel; therefore, the switching between manual mode and automatic mode is more easy.

The above first operation and second operation may be the same operation on the control object displayed on the touch screen (an "operation" on an object displayed on a touch screen is referred to as a "gesture"). If the first operation and the second operation are the same, a player has only to repeat the same operation such as tapping on a control object for switching between manual mode and automatic mode. The first operation and the second operation may be any desirable operations perceivable to the touch screen, including tap, double tap, hold (long press), pinch out, pinch in, flick, drag, or any desired combination of these operations.

A game program according to an embodiment of the present invention further comprises a reception module for receiving an instruction to at least one of a plurality of player units in manual mode. The instruction may include, for example, an instruction to a particular player unit for movement, attack, or use of an item. The reception module according to an embodiment of the present invention is configured not to receive an instruction to player units in automatic mode.

The game program according to an embodiment of the present invention comprises a sending module configured to send instructions from the above player and other data related to progression of the game to a server communicatively connected to the client terminal. The sending module is configured to send, to the above server, unit instruction information indicating an instruction from the player to at least one of the plurality of player units when, for example, a third operation is performed on the control object in manual mode. The unit instruction information may include various information indicating an instruction to the player unit, such as movement instruction information related to movement of the unit, attack instruction information related to an attack, and item instruction information related to use of items.

The third operation on the control object is different from the above first operation on the control object. When, for example, the third operation includes contact with the control object displayed on the touch screen for a predetermined time (a predetermined length of hold), the first operation includes contact with the control object for a period longer than the predetermined time (a hold longer than the predetermined time). The above examples of the first operation and the third operation are not limitative; the first operation and the third operation can be any desirable operations as long as the first operation and the third operation are different. For example, the first operation may be tap, while the third operation may be flick. Thus, the client terminal can recognize which of the first operation and the third operation has been performed on the control object in manual mode.

A server according to an embodiment of the present invention perform, in each turn, a battle process between a player unit and a non-player unit in accordance with a predetermined battle logic. The battle process is performed by, for example, a battle module provided to the server. When the game is in manual mode, the battle module according to an embodiment of the present invention performs a battle process based on unit instruction information indicating an instruction to at least one of the player units and a particular battle logic; in contrast, when the game is in automatic mode, the battle module performs a battle process based on the above battle logic independently of the unit instruction information.

Herein, the term battle logic refers to various rules for performing a battle process between a player unit and a non-player unit; and the rules include, for example, rules about movement of the unit, rules about execution of an attack, rules about result of an attack, and rules about termination of the game. For example, the above battle module can determine where each unit moves in each turn based on the rules about movement of units. This operation refers to the attributes related to movements assigned to each unit (e.g., an attribute defining the moving range such as the maximum possible moving distance). Further, the above battle module determines whether a unit attacks another unit and which unit is to be attacked based on the rules about execution of an attack, and also determines what degree of damage is imparted on the attacked unit based on the rules about the result of an attack.

The server according to an embodiment of the present invention performs a battle process in accordance with a predetermined battle logic as described above, and then provides battle log information indicating the contents of the battle process to the client terminal. The battle log information is provided by, for example, a data providing module provided to the server. The battle log information is generated for each turn. In an embodiment of the present invention, the battle log information includes various data indicating the contents of the battle process in each turn, such as movement data indicating the movement of player units and non-player units (e.g., data indicating the positions after the movement and the moving route), attack data indicating the result of an attack by each unit, damage data indicating the magnitude of the damage imparted on each unit, and earned point data indicating the points such as experience points earned by the player unit and the non-player unit. As described above, the battle process in manual mode is performed based on the unit instruction information from the client terminal and the battle logic. The battle log information thus generated in manual mode may be herein referred to as the first battle log information, and the battle log information generated in automatic mode may be referred to as the second battle log information. The second battle log information is different from the first battle log information in that it is generated in automatic mode independently of the unit instruction information.

The game program according to an embodiment of the present invention comprises a presentation module configured to present, to a player, a battle scene information indicating a battle scene between a plurality of player units and a plurality of non-player units. In manual mode, the presentation module according to an embodiment of the present invention presents the battle scene information when a third operation is performed on the control object; in contrast, in automatic mode, the presentation module presents the battle scene information independently of the operation on the control object.

In an embodiment of the present invention, the battle scene information is generated by the presentation module based on the battle log information presented from the server. As described above, the battle log information includes movement data indicating the movement of each unit, attack data indicating the result of an attack by each unit, damage data indicating the magnitude of damage imparted on each unit, and earned point data. Therefore, the presentation module according to an embodiment of the present invention generates battle scene information (e.g., animation) reproducing the movement and the attack by each unit based on the battle log information, and displays the generated battle scene information on the touch screen. The battle scene information includes various information indicating a battle scene between the player unit and the non-player unit, such as information indicating movement of the units, attacks by the units, and use of items by the units. For example, the presentation module according to an embodiment of the present invention is configured to display an animation that represents the information indicating the battle scene on the touch screen of the client terminal.

In the game system according to an embodiment of the present invention as described above, when a player makes a third operation on the control object in manual mode, unit instruction information is sent from the client terminal to the server; and the server generates the first log information based on the unit instruction information from the client terminal and a predetermined battle logic. The first log information is sent to the client terminal; and the client terminal generates battle scene information based on the first log information. The generated battle scene information is then presented to the player. Accordingly, in manual mode, when a third operation is made on the control object, the battle scene information is presented to the player. Meanwhile, in automatic mode, the battle scene information is generated based on the second log information generated independently of the unit instruction information; therefore, the battle process is performed without an operation on the control object, and the battle scene information indicating the battle scene is presented to the player.

In an embodiment of the present invention, a battle performed in the battle game includes a first battle and a second battle subsequent to the first battle. The first battle according to an embodiment of the present invention involves a specific non-player unit among a plurality of non-player units; and the second battle does not involve the specific non-player unit.

The game program according to an embodiment of the present invention further comprises a termination process module. The termination process module according to an embodiment of the present invention is configured to determine, in manual mode, to start the second battle after termination of the first battle in accordance with selection by the player and determine, in automatic mode, whether to start the second battle after termination of the first battle independently of the selection by the player. In an embodiment, the termination process module is configured not to start the second battle in automatic mode.

In an embodiment of the present invention, the above battle includes various forms of battles performed in games, such as a battle between the player camp and another camp in a strategic simulation game, a battle between a player team and another team in a sports game (e.g., based ball game or football game), and a battle between a player party and an enemy party in a role playing game.

A program according to an embodiment of the present invention provides a game, the game system comprising one or more processors to execute a game program, wherein a plurality of player units battle with a plurality of non-player units in either manual mode or automatic mode. The game program according to an embodiment of the present invention causes a computer to function as: an object display unit configured to display a control object on a touch screen provided to a client terminal; a transition unit configured to switch the game from the manual mode to the automatic mode when a first operation is performed on the control object in the manual mode and configured to switch the game from the automatic mode to the manual mode when a second operation is performed on the control object in the automatic mode; and a presentation unit configured to present, to a player, a battle scene information indicating a battle scene between the plurality of player units and the plurality of non-player units. According to an embodiment, in manual mode, the presentation unit presents the battle scene information when a third operation is performed on the control object, whereas in automatic mode, the presentation module presents the battle scene information independently of the operation on the control object.

A method according to an embodiment of the present invention provides a game wherein a plurality of player units battle with a plurality of non-player units in either manual mode or automatic mode. The method according to an embodiment of the present invention comprises the steps of: displaying a control object on a touch screen provided to a client terminal; switching the game from the manual mode to the automatic mode when a first operation is performed on the control object in the manual mode and switching the game from the automatic mode to the manual mode when a second operation is performed on the control object in the automatic mode; and presenting, to a player, a battle scene information indicating a battle scene between the plurality of player units and the plurality of non-player units. In manual mode, the presenting step according to an embodiment presents the battle scene information when a third operation is performed on the control object; in contrast, in automatic mode, the presenting step presents the battle scene information independently of the operation on the control object.

ADVANTAGES

Various embodiments of the present invention provide a game system, a game program, and a method for providing a game that can be switched between manual mode and automatic mode through a simple operation.

DESCRIPTION OF EXAMPLE EMBODIMENTS

Figure 1:
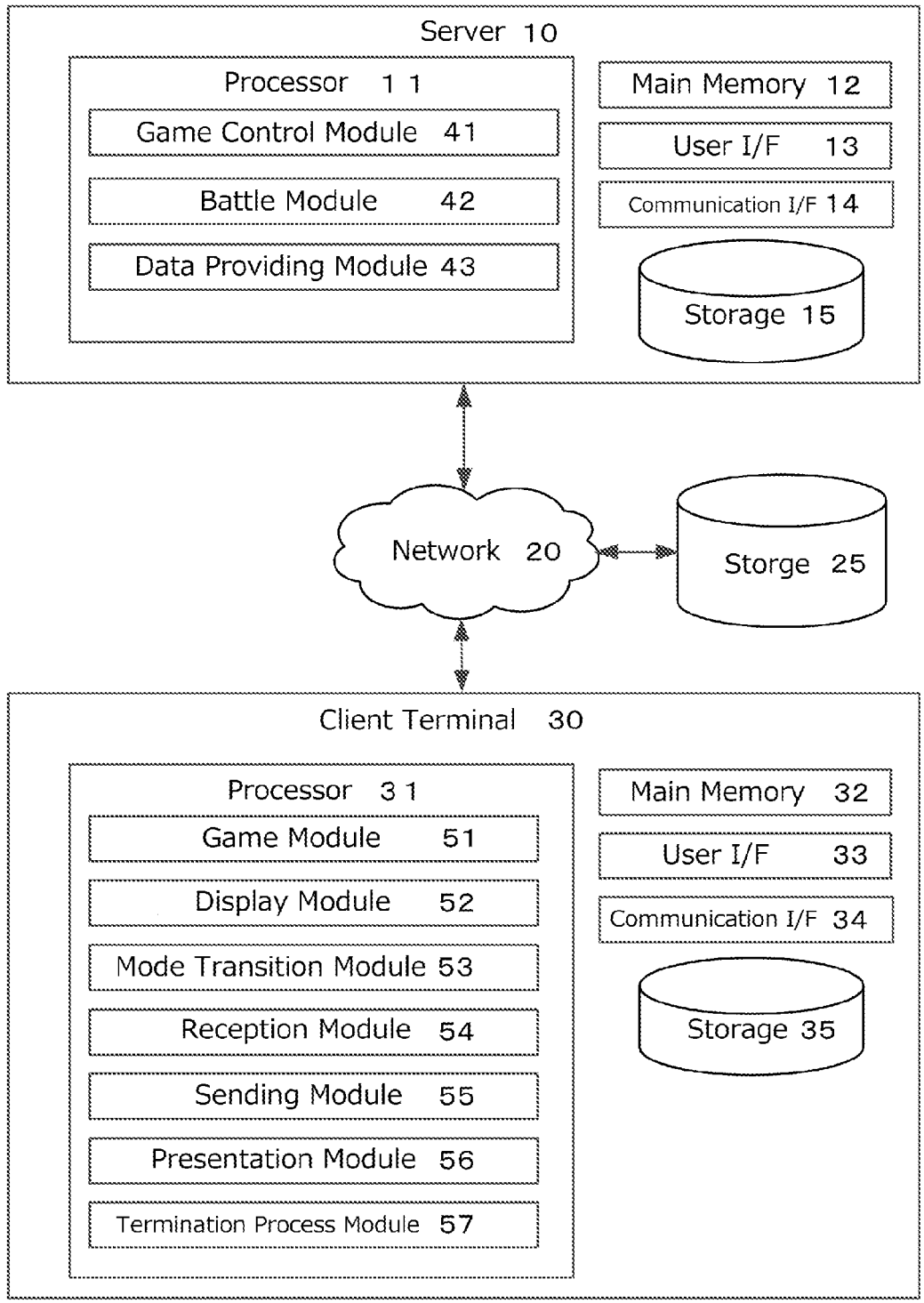
FIG. 1 is a block diagram schematically illustrating a game system according to an embodiment of the present invention.

FIG. 1 is a block diagram schematically showing a game system for providing a battle game in either manual mode or automatic mode, in accordance with an embodiment of the present invention. A battle game according to an embodiment of the present invention can perform a battle between a plurality of player units and a plurality of non-player units. As described above, the battle may include the first battle and the second battle subsequent to the first battle.

As shown, the game system according to an embodiment of the present invention may comprise a server 10 and a client terminal 30. The server 10 may be communicatively connected to the client terminal 30 via a network 20 such as the Internet and provide the client terminal 30 with online game services. For example, the server 10 may process a game message (e.g., a message related to operations of a player unit (or a player character) or a message that a quest has been started) received from the client terminal 30 in accordance with a predetermined game logic (or a program for implementing the game logic), and return a result of the process to the client terminal 30. The server 10 may also provide various game data required for progress of the games to the client terminal 30. Although FIG. 1 shows only one client terminal 30, the server 10 may be communicatively connected to a plurality of client terminals 30.

As shown, the server 10 may include a processor 11, a main memory 12, a user I/F 13, a communication I/F 14, and a storage 15. These components may be electrically connected to each other via a bus not shown. The processor 11 may load an operating system and various programs for implementing the game logic into the main memory 12 from the storage 15, and may execute commands included in the loaded programs. The main memory 12 may be used to store a program to be executed by the processor 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the processor 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the client terminal 30 via the network 20.

The storage 15 may be formed of, for example, a magnetic disk drive and store various programs such as a game control program for implementing the game logic. The storage 15 may also store various data used in the game. The various data that may be stored in the storage 15 may also be stored on a database server communicatively connected to the server 10 and physically separate from the server 10.

In an embodiment, the server 10 may be a web server for managing a web site including a plurality of hierarchical web pages. The client terminal 30 may fetch HTML data for rendering these web pages from the server 10 and analyze the fetched HTML data to render a game screen on a display of the client terminal 30. A player may provide various inputs to the client terminal 30 via the game screen thereby to interact with a game provided by the server 10 (e.g., the player may operate a player character with instructions or select a menu). A game provided through such a web page is sometimes called a browser game. The storage 15 may store the HTML data for rendering the web page. The HTML data may be composed of HTML code written in a markup language such as HTML. The HTML code may be associated with various images. Additionally, the HTML data may include programs written in script languages such as ActionScript™ and JavaScript™.

The storage 15 may store game application programs to be executed on execution environments, such as an OS or middleware, of the client terminal 30. The game application programs may include, on execution on the client terminal 30, instruction sets for processing game data provided by the server 10 and various data such as image data referred to when the instruction sets are executed. The game application programs may be created in, for example, object oriented languages such as Objective-C™ and Java™. The created game application programs may be stored on the storage 15. The game application programs may also be stored on an external storage 25 outside the server 10 or another storage not shown.

In response to a delivery request from the client terminal 30, the game application programs stored on a storage such as the storage 15 or the external storage 25 may be delivered to the client terminal 30. The delivered game application programs may be received by the client terminal 30 via a communication I/F 34 under the control by the processor 31. The received game application programs may be stored on, e.g., the storage 35. The application software may be launched in accordance with the player's operation on the client device 30 and may be executed on a platform, such as an OS or middleware, implemented on the client device 30.

The server 10 may process the game messages from the client terminal 30 in accordance with a predetermined game logic to control the progress of the game. For example, the server 10 may receive a quest management message from the client terminal 30 indicating that a particular quest on a map has been completed, and provide quest information related to another quest. As will be described later, the server 10 may have a function of processing, in accordance with a predetermined battle logic, a battle between a player unit operated by a player and a non-player unit operated by a computer in accordance with a predetermined logic.

The game application programs executed on the client terminal 30 may receive, from the server 10, a game message and battle log information indicating the contents of the battle process based on the battle logic. The battle log information will be described in detail later. The game application programs may generate a game screen based on the result of the process of the game messages and various game data related to the game (e.g., data related to user characters, data related to player units and non-player units, data representing a virtual space of the game, and data related to various objects to be displayed in the virtual space), and display the generated game screen on the display of the client terminal 30. As with the browser games, a player may provide various inputs to the client terminal 30 based on the game screen, thereby to interact with the game implemented by the server 10 and the game application programs. The server 10 can store, for each player, various data such as game messages sent from the game application programs, thereby managing the progress of the game for each player.

Thus, the server 10 may manage the web site for providing game services and deliver web pages constituting the web site in response to a request from the client terminal 30, thereby progressing the game. Further, the server 10 according to another embodiment of the present invention may process the game messages received from the game application programs executed on the client terminal 30, thereby to progress the online game. Briefly, the server 10 may also include a function to authenticate a player at start of the game and perform charging process in accordance with progression of the game. The games provided by the server 10 may include any desired games such as action games, role playing games, and baseball games wherein a player operates his own unit and battles with a non-player unit. The types of the games implemented by the server 10 and the client terminal 30 (or the game application programs executed on the client terminal 30) are not limited to those explicitly described herein. The server 10 may provide game services to the client terminal 30 in a manner as described above.

Next, client terminal 30 will be described below. The client terminal 30 according to an embodiment of the present invention may be a desired information processing device including at least one of an environment for rendering web pages of a game web site fetched from the server 10 on a web browser and an application execution environment for executing game application programs. Non-limiting examples of the client terminal 30 may include mobile phones, smartphones, tablet terminals, personal computers, electronic book readers, and game consoles.

As shown, the client terminal 30 according to an embodiment of the present invention may include a processor 31, a main memory 32, a user interface (I/F) 33, a communication I/F 34, and a storage 35, and these components may be electrically connected to one another via a bus 36.

The processor 31 may load various programs such as an operating system into the main memory 32 from the storage 35, and may execute commands included in the loaded programs. The main memory 32 may be used to store a program to be executed by the processor 31, and may be formed of, for example, a dynamic random access memory (DRAM).

The user I/F 33 may include an information input device for receiving inputs from the player and an information output device for outputting an operation result of the processor 31; and the user I/F 33 may include a display device such as a liquid crystal display having a touch screen. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the network 20.

The storage 35 may comprise, for example, a magnetic disk drive or a flash memory and store various programs such as an operating system. When receiving a game application program from the server 10 via the communication I/F 34, the storage 35 may store the received game application program.

The client terminal 30 may include, for example, browser software for interpreting an HTML file (HTML data) and rendering a screen; this browser software may enable the terminal device 30 to interpret the HTML data fetched from the server 10 and render web pages corresponding to the received HTML data. Further, the client terminal 30 may include plug-in software (e.g., Flash Player distributed by Adobe Systems Incorporated) embedded into browser software; therefore, the terminal device 30 can fetch from the server 10 a SWF file embedded in HTML data and execute the SWF file by using the browser software and the plug-in software. In the client terminal 30, the game application program may be launched in accordance with the operation by the player and executed on a platform implemented on the client terminal 30.

When a game application program is executed on the client terminal 30, for example, animation or an operation icon designated by the program may be displayed on a screen of the client terminal 30. The player may enter an instruction for progressing the game through the user I/F 33 of the client terminal 30.

Next, further detailed description will be made on the functions of the server 10 and the functions of the game programs executed on the client terminal 30. The game program according to an embodiment of the present invention may comprise: a game control module 41; a battle module 42; data providing module 43; a game module 51; a display module 52; a mode transition module 53; a reception module 54; a sending module 55; a presentation module 56; and a termination process module 57. The functions of the server 10 and the client terminal 30 can be implemented by executing a part or all of these modules.

As shown in FIG. 1, modules executed by the processor 11 of the server 10 according to an embodiment of the present invention may include: a game control module 41 for implementing a basic function for progressing the first game in accordance with predetermined game logic; a battle module 42 for performing a battle process between a player unit and a non-player unit based on predetermined battle logic and unit instruction information indicating the instructions from the player to the player unit and a data providing module 43 for providing the client terminal 30 with battle log information indicating the result of the battle process.

Further, modules executed by the processor 31 of the client terminal 30 may include: a game module 51 for generating an instance of the virtual space of the game based on the game data received from the server 10; a reception module 54 for receiving an instruction to a player unit; a sending module 55 for sending unit instruction information indicating the instruction from a player to the player unit and data related to progress of the game; a display module 52 for displaying a control object on the touch screen of the client terminal 10; a mode transition module 53 for switching the game from manual mode to automatic mode or from automatic mode to manual mode; a presentation module 56 for presenting, to the player, battle scene information indicating a battle scene between the player unit and the non-player unit; and a termination module 57 for determining whether to transition to an additional battle after an initial battle is terminated.

A part or all of the modules described herein to be executed on the server 10 may also be executed by the processor 31 of the client terminal 30 or a processor of other devices; and a part or all of the modules described herein to be executed on the client terminal 30 may also be executed by the processor 11 of the server 10 or a processor of other devices.

The modules executed by the processor 11 of the server 10 will be described below. The game control module 41 according to an embodiment of the present invention may provide various game data for performing a battle game. The game data provided by the game control module 41 may include, for example, unit data related to a player unit or a non-player unit, view data for rendering the virtual space of the game in the screen, object data related to various objects to be displayed in the virtual space, and quest data related to a quest experienced by the player. Also, the game control module 41 may provide a chat function and a messaging function to encourage communication between players.

The battle module 42 according to an embodiment of the present invention may perform, in each turn, a battle process between a player unit and a non-player unit in accordance with a predetermined battle logic. For example, when the game is in manual mode, the battle module 42 may perform a battle process based on unit instruction information received from the client terminal 30 and predetermined battle logic; in contrast, when the game is in automatic mode, the battle module 42 may perform a battle process based on the predetermined battle logic independently of the unit instruction information.

The data providing module 43 according to an embodiment of the present invention may provide the client terminal 30 with battle log information indicating the contents of the battle process performed by the battle module 42. The battle log information is generated, e.g., for each turn. In an embodiment of the present invention, the battle log information may include various data indicating the contents of the battle process in each turn, such as movement data indicating the movement of player units and non-player units (e.g., data indicating the positions after the movement and the moving route), attack data indicating the result of an attack by each unit, damage data indicating the magnitude of the damage imparted on each unit, and earned point data indicating the points such as experience points earned by the player unit and the non-player unit. The battle log information in the present invention is not limited to that specifically described herein and may include any desired information indicating the contents of the battle process performed by the battle module 42.

The modules executed by the processor 31 of the client terminal 30 will be described below. The game module 51 according to an embodiment of the present invention may be configured to generate a game screen of the battle game based on the game data related to the battle game received from the server 10 and display the generated game screen on the display of the client terminal 30. The game data provided by the server 10 may include various information such as landform information indicating the landform of the virtual space, map information indicating the positions and routes accessible to the player unit, object information specifying the types and positions of the objects to be placed in the virtual space, and non-player unit information for specifying the types, positions, and movement range of non-player unit. The game module 51 according to an embodiment of the present invention can generate a game screen including a player unit, a non-player unit, a map, an object, etc. placed therein and present the generated game screen to the player. Thus, the game module 51 according to an embodiment of the present invention may generate a game screen including the images and animation representing the virtual space of the battle game based on the game data provided by the server 10, and display the game screen on the display of the client terminal 30, thereby to present the instance of the virtual space to the player.

Figure 2:
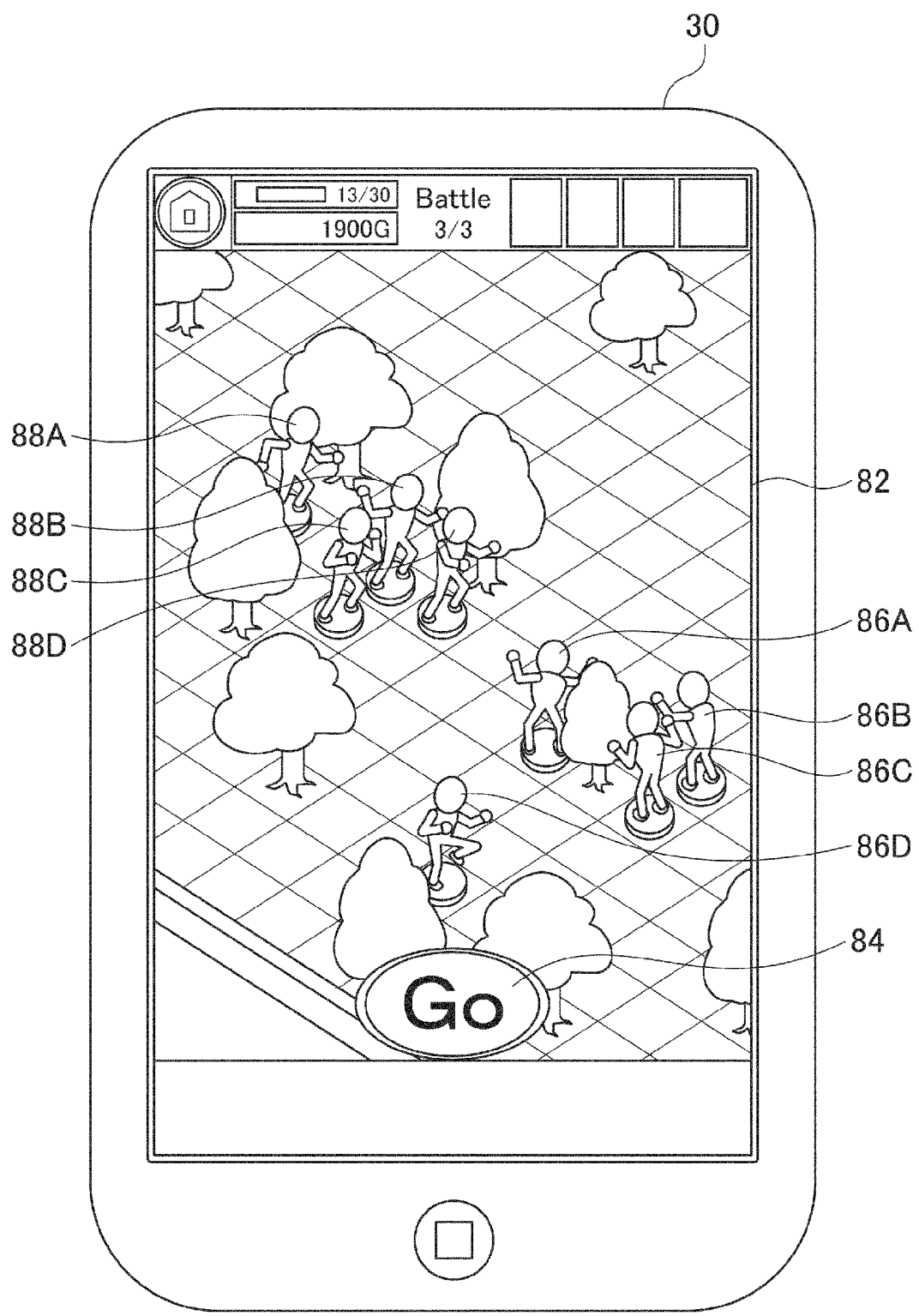
FIG. 2 is a diagram showing an example of a game screen (in manual mode) according to an embodiment of the present invention.

FIG. 2 shows an example of a game screen according to an embodiment of the present invention. More specifically, FIG. 2 shows an example of a game screen in manual mode displayed on the touch screen of the client terminal 30. As described above, this game screen may be generated based on various game data received from the server 10.

As in the embodiment shown in FIG. 2, the game screen 82 showing an instance of the virtual space of the battle game may be displayed on the touch screen of the client terminal 30. The game screen 82 is partitioned into a large number of cells; and on a part of these cells may be placed objects 86A to 86D each representing a player unit operated by the player (hereinafter simply referred to as player units 86A to 86D) and non-player units 88A to 88D operated by a computer in accordance with predetermined logic (hereinafter simply referred to as non-player units 88A to 88D). In addition, a plurality of objects representing trees may be placed on the cells in the game screen 82. The game screen shown in FIG. 2 is a mere example; the game screen 82 may contain various other objects in accordance with the contents of the game. The game screen 82 may contain icons for using a menu screen and messaging functions of the game, and other various objects for the player to make input operations.

Figure 3:
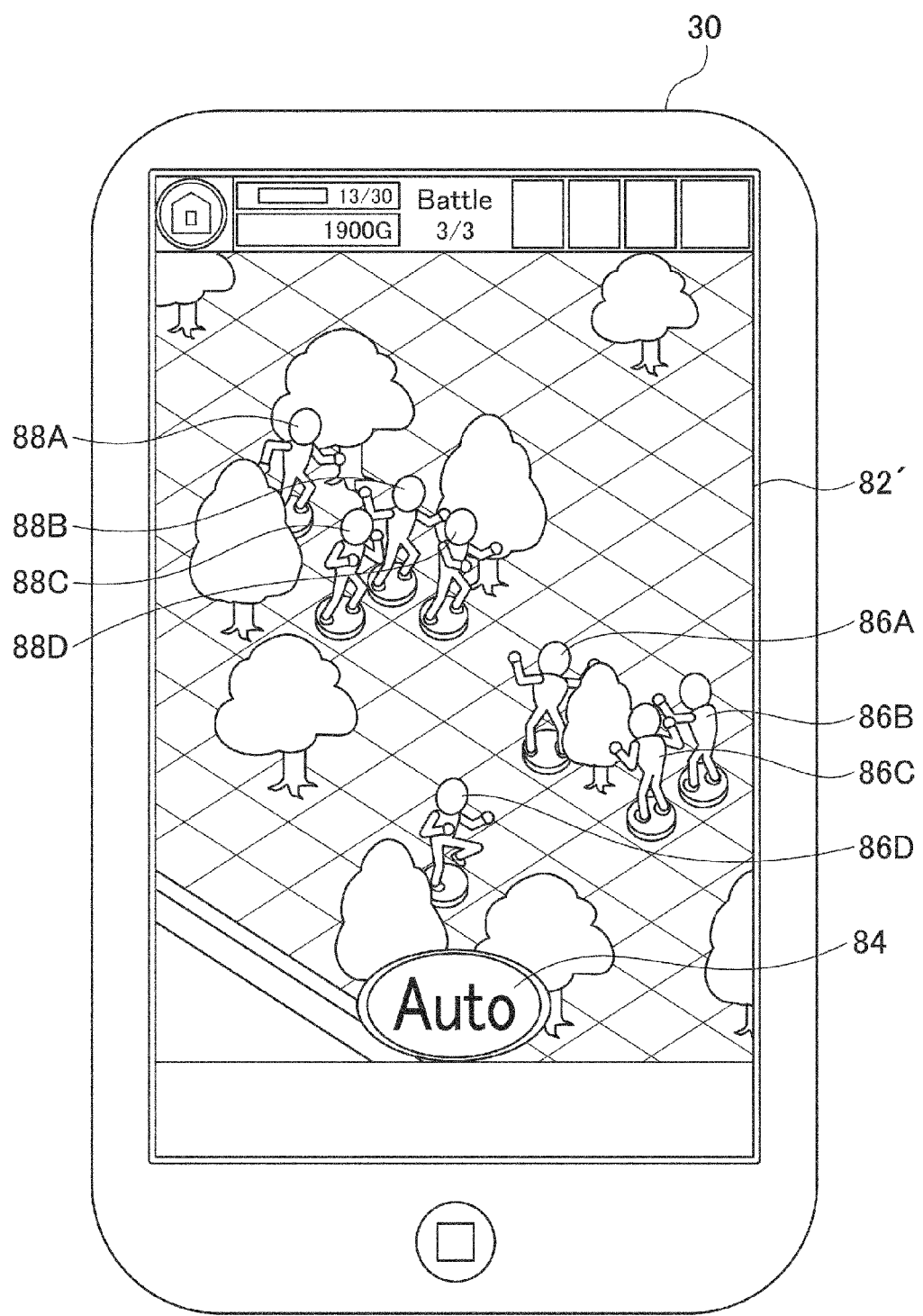
FIG. 3 is a diagram showing an example of a game screen (in automatic mode) according to an embodiment of the present invention.

The display module 52 according to an embodiment of the present invention may cause a control object 84 to be displayed in the game screen 82. As shown in FIG. 2, the control object 84 may be displayed, e.g., in the rough middle of the lower edge of the game screen 82. As will be described later, the control object 84 may be used for switching between manual mode and automatic mode and instructing confirmation of instructions to a player unit The mode transition module 53 according to an embodiment of the present invention may be configured to switch the game from manual mode to automatic mode when a first operation (e.g., tap or double tap) is made on the control object 84 in manual mode as shown in FIG. 2. When the game is switched to automatic mode, the game screen 82' shown in FIG. 3 may be displayed on the client terminal 30. FIG. 3 shows an example of a game screen in automatic mode displayed on the touch screen of the client terminal 30. The game screen 82' may be the same as the game screen 82 except for a change in appearance of the control object 84. In the game screen 82' shown in FIG. 3, the control object 84 includes the characters "Auto"; therefore, the player seeing the game screen 82' can grasp that the game is in automatic mode. In contrast, the control object 84 shown in FIG. 2 includes the characters "Go"; therefore, the player seeing the game screen 82 can grasp that the game is in manual mode.

The mode transition module 53 according to an embodiment of the present invention may be configured to switch the game from automatic mode to manual mode when a second operation (e.g., tap or double tap) is made on the control object 84 in automatic mode as shown in FIG. 3. The second operation on the control object 84 may be either a same type of operation as the first operation mentioned above (e.g., the first operation and the second operation may be both tap operations) or a different type of operation than the first operation.

The reception module 54 according to an embodiment of the present invention can receive instructions from the player to the player units 86A to 86D. In manual mode, the player can make instructions to the player units 86A to 86D by making a predetermined operation (e.g., tap, double tap, or drag) on the regions of the touch screen where the player units 86A to 86D are displayed. The instructions from the player to the player units may include various instructions related to a battle with the non-player units 88A to 88D, for example, movement to a particular cell, attack on the non-player units 88A to 88D, and use of an item. The reception module according to an embodiment may be configured not to receive an instruction to player units in automatic mode. The reception module 54 may determine an instruction to at least one of the player units 86A to 86D based one, e.g., the signals outputted from the touch screen. The signals outputted from the touch screen may include information indicating the type of operation by the player (e.g., information indicating that the operation is drag), information indicating the position of the region of the touch screen where the operation was made (e.g., information indicating the start position and the end position of a drag operation), and other various information indicating instructions to the player units 86A to 86D.

When, in manual mode, an instruction to at least one of the plurality of player units 86A to 86D is inputted and a third operation (e.g., tap or double tap) is made on the control object 84, the sending module 55 according to an embodiment of the present invention may send, to the server 10, unit instruction information indicating an instruction from the player to the player units 86A to 86D. The third operation on the control object may be different from the above first operation on the control object. The unit instruction information may include various information indicating instructions to the player units 86A to 86D such as movement instruction information related to movement of the player units 86A to 86D, attack instruction information related to execution of an attack on the non-player units 88A to 88D, and item instruction information for instructing the player units 86A to 86D to use an item. The sending module 55 may also be configured to send to the server 10 various game data related to progress of the game, in addition to the unit instruction information.

The presentation module 56 according to an embodiment of the present invention may be configured to present, to the player, battle scene information indicating a battle scene between the plurality of player units 86A to 86D and the plurality of non-player units 88A to 88D. The presentation module 56 may generate the battle scene information based on, for example, battle log information provided by the server. As described above, the battle log information includes movement data indicating the movement of each unit, attack data indicating the result of an attack by each unit, damage data indicating the magnitude of damage imparted on each unit, and earned point data. Therefore, the presentation module 56 may generate battle scene information (e.g., animation) so as to reproduce the movement and the attack by each unit based on the battle log information, and display the generated battle scene information on the touch screen.

Figure 4:
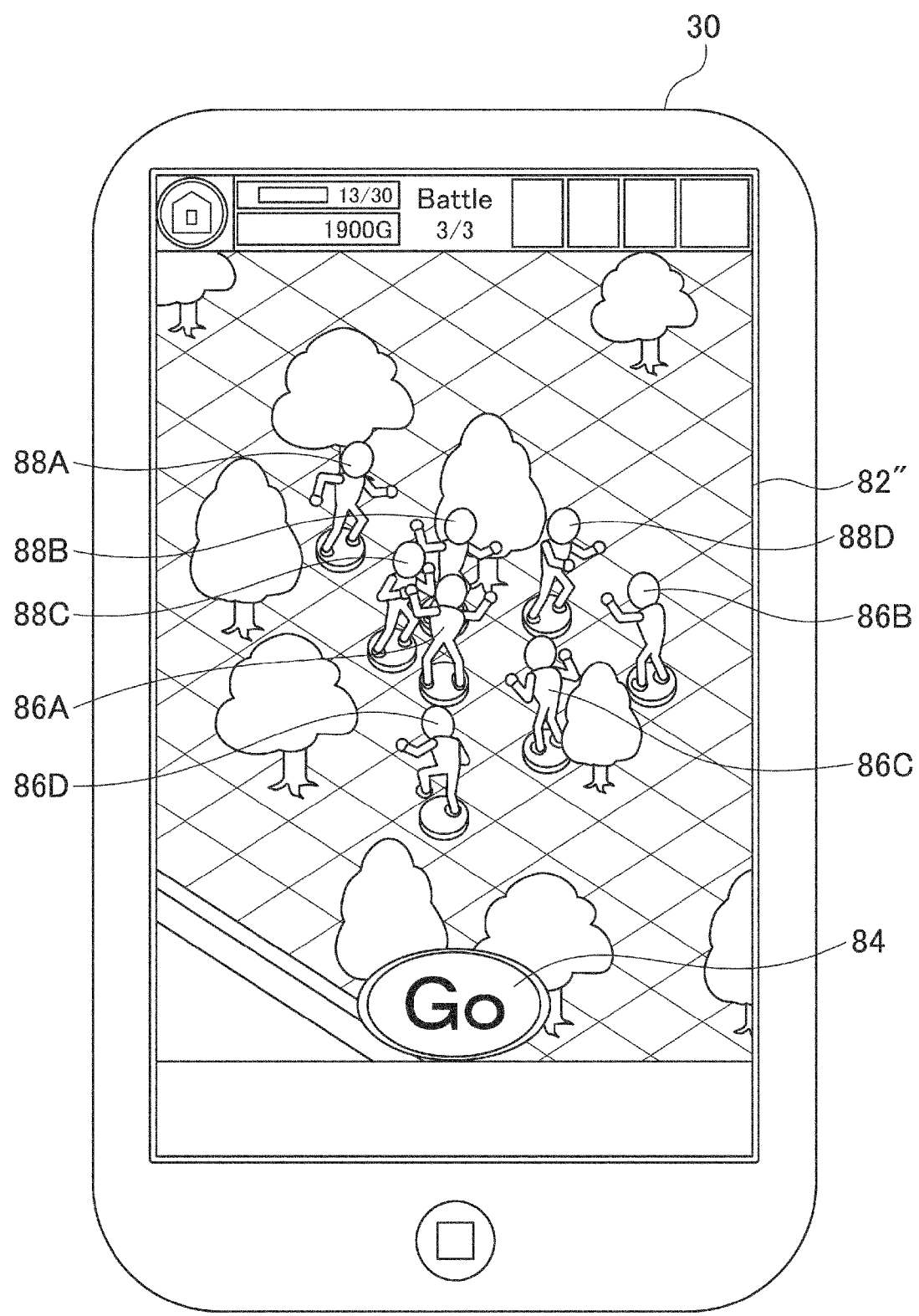
FIG. 4 is a diagram showing an example of a game screen (in manual mode) according to an embodiment of the present invention.

Presentation of the battle scene information according to an embodiment of the present invention will be described with reference to FIGS. 2 and 4. FIG. 4 shows an example of a game screen after a battle process executed in response to a third operation on the control object 84 in the game screen 82 shown in FIG. 2. For example, when, in the game screen 82 shown in FIG. 2, the player instructs the player units 86A to 86D to move to a particular position and attack at least one of the non-player units 88A to 88D and then makes a third operation on the control object 84, the battle module 42 may perform a battle process based on the unit instruction information indicating the instructions, and the data providing module 43 may generate battle log information indicating the contents of the battle process. The presentation module 56 according to an embodiment of the present invention may generate the battle scene information based on the battle log information. The battle scene information may include, for example, animation representing movement of the player unit 86A to 86D from the positions shown in FIG. 2 to the positions shown in FIG. 4, animation representing an attack on the non-player units 88A to 88D by the player units 86A to 86D, and animation representing use of items by the player units 86A to 86D. The providing module 56 according to an embodiment of the present invention may display the above animation on the touch screen of the client terminal 30 thereby to present, to the player, battle scene information indicating the battle scene between the player unit 86A to 86D and the non-player units 88A to 88D. The battle scene information in the present invention is not limited to that described above and may include various information indicating a battle scene between the player units 86A to 86D and the non-player units 88A to 88D, such as information indicating movement of the non-player units 88A to 88D and an attack on the player units 86A to 86D by the non-player units 88A to 88D. Further, presentation of the battle scene information to the player may be implemented by various methods obvious to those skilled in the art other than animation.

The termination process module 57 according to an embodiment of the present invention may perform a process related to termination of a battle. A battle in a game provided by the game system of the present invention may include a first battle and a second battle subsequent to the first battle. The termination process module 57 according to an embodiment may be configured to determine, in manual mode, to start the second battle after termination of the first battle in accordance with selection by the player and determine, in automatic mode, whether to start the second battle after termination of the first battle independently of the selection by the player. In an embodiment, the termination process module is configured not to start the second battle in automatic mode.

The first battle of the battle game according to an embodiment of the present invention may involve a specific non-player unit among a plurality of non-player units; and the second battle does not involve the specific non-player unit. The specific non-player unit may be, for example, a unit corresponding to a commander in a strategic simulation game; and the condition for winning the first battle may be to defeat the specific non-player unit (the termination condition of the first battle). In the example shown in FIG. 2, for example, one of the non-player units 88A to 88D may be a specific non-player unit; and this specific non-player unit can be defeated by imparting a predetermined amount or more of damage. The second battle may be, for example, a simulation of a mop-up after the commander is defeated. In an embodiment of the present invention, the second battle may be performed between remaining units of one camp of which a unit corresponding to the commander has been defeated and another camp, with the status taken over from the terminated first battle.

Figure 5:
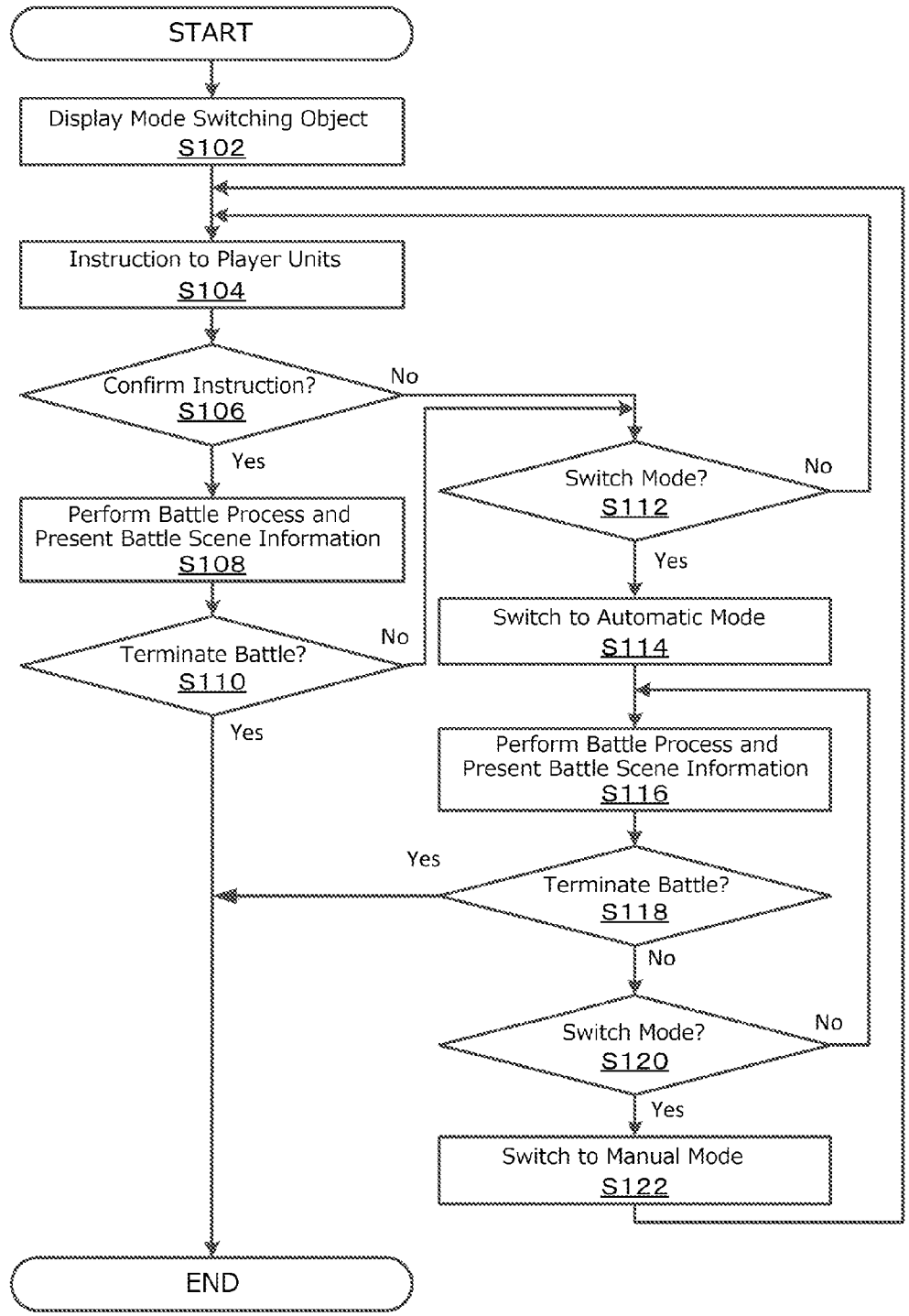
FIG. 5 is a flow diagram showing a flow of the process of switching between manual mode and automatic mode.

Next, FIG. 5 will be referred to for describing the process flow from the start to end of a battle game wherein a plurality of player units battle with a plurality of non-player units in accordance with an embodiment of the present invention. First, in step S102, when an application program for performing a particular battle game is started on a client terminal, a game screen containing a control object may be displayed on a touch screen of the client terminal. This battle game may be set to, for example, manual mode when started. The game screen may be, for example, the game screen 82 shown in FIG. 2; and the control object may be, for example, the control object 84 in the above embodiment. Display of the game screen and the control object may be performed by, for example, the above game module 51 and display module 52.

Next, in step S104, the player may input an instruction to at least one of a plurality of player units. The instruction to at least one of the plurality of player units may be received by the reception module 54 described above.

Next, in step S106, it is determined whether an instruction confirmation operation has been made to confirm the instruction to the player units; if the instruction confirmation operation has been made, unit instruction information indicating the contents of the instruction to the player units may be sent to the server. In the example shown in FIG. 2, the instruction confirmation operation for confirming the instruction to the player units may be the third operation on the control object 84; and the server may be the server 10 described above. Further, for example, the above sending module 53 may determine whether an instruction confirmation operation has been made and send the unit instruction information.

If the instruction confirmation operation has been made in step S106, the process may proceed to step S108. In step S108, a battle process between the player units and the non-player units may be performed in accordance with the unit instruction information from the client terminal and particular battle logic. The battle process may be performed by, for example, a battle module 42 described above. The battle log information indicating the contents of the battle process may be provided to the client terminal. The battle log information may be provided by, for example, the above-described data providing module 43. On the client terminal, battle scene information indicating a battle scene between the player units and the non-player units may be presented based on the received battle log information. The battle log information may be presented by, for example, the above-described presentation module 56.

Next, in step S110, it is determined whether a predetermined termination condition has been satisfied as a result of the battle process in step S108. If it is determined that the termination condition has been satisfied, the battle is terminated. For example, the above-described termination process module 57 may determine whether the battle has been terminated based on the battle log information. When the battle includes a first battle and a second battle subsequent to the first battle, the second battle may be started when it is determined in step S110 that the termination condition of the first battle has been satisfied. The process for starting the second battle may be performed by, for example, the terminal process module 57 described above.

When it is determined in step S110 that the termination condition has not been satisfied, or when it is determined in step S106 that an instruction confirmation operation has not been made, the process may proceed to step S112. In step S112, it is determined whether a mode switch operation has been made. In the example shown in FIG. 2, the mode switch operation may be a first operation on the control object 84 in manual mode. If the mode switch operation (first operation) has been made on the control object, the game may be switched to the automatic mode in step S114. If the mode switch operation has not been made on the control object, the process may proceed to step S104 where an instruction to the player units may be received again. For example, the mode transition module 53 described above may determine whether a first operation has been made on the control object and switch the game to the automatic mode.

When the game is switched to automatic mode, the client terminal may display the game screen 82" shown in FIG. 4. After this battle game is switched to automatic mode, the battle process may be performed in step S116 without any instruction from the player to the player units and any confirmation operation therefor. In step S116, a battle process between the player units and the non-player units may be performed in accordance with predetermined battle logic. The battle process may be performed by, for example, a battle module 42 described above. The battle log information indicating the contents of the battle process may be provided to the client terminal. The battle log information may be provided by, for example, the above-described data providing module 43. On the client terminal, battle scene information indicating a battle scene between the player units and the non-player units may be presented based on the received battle log information. The battle log information may be presented by, for example, the above-described presentation module 56.

Next, in step S118, it may be determined whether a predetermined termination condition has been satisfied as a result of the battle process in step S116. For example, it may be determined in step S110 whether the termination condition has been satisfied as in step S110. In an embodiment of the present invention, when the battle includes a first battle and a second battle subsequent to the first battle, the second battle may be started when it is determined in step S118 that the termination condition of the first battle has been satisfied. In another embodiment of the present invention, even when the battle includes a first battle and a second battle subsequent to the first battle and it is determined in step S118 that the termination condition of the first battle has been satisfied, the second battle may not be started and the battle process may be terminated. For example, the above-described termination process module 57 may determine in step S118 whether the battle has been terminated based on the battle log information.

When it is determined in step S118 that the termination condition has not been satisfied, the process may proceed to step S120. In step S120, it is determined whether a mode switch operation (in automatic mode) has been made. In the example shown in FIG. 4, the mode switch operation may be a second operation on the control object 84. If the second operation has been made on the control object 84, the process may proceed to step S122 where the battle game may be switched to the manual mode. If the second operation has not been made on the control object, the process may return to step S116 where the battle process for the next turn may be performed and the battle scene information may be presented. For example, the mode transition module 53 described above may determine whether a second operation has been made on the control object and switch the game to the manual mode.

In the embodiments as described above, a player can readily switch the game between manual mode and automatic mode by making the first and second operations on the control object displayed on the touch screen. This switching operation may be simpler if the first and second operations are similar operations (e.g., tap) on the touch screen. Further, the control object may be displayed at a same position on a game screen (touch screen) in both manual mode and automatic mode. Thus, the player can switch the game between manual mode and automatic mode without changing the hand position on the client terminal; this may enable easier switching between the modes. Further, in manual mode, a third operation different from the first operation may be made on the control object to confirm the input operation for the player units and progress the battle process. That is, the battle process in manual mode can be progressed through operations on the control object. Thus, all the operations for progressing the battle game may be made through operations on the control object; therefore, the battle game can be progressed with simple operations.

As described above, a part or all of the modules described to be executed on the server 10 may also be executed by the processor 31 of the client terminal 30 or a processor of other devices; and a part or all of the modules described herein to be executed on the client terminal 30 may also be executed by the processor 11 of the server 10 or a processor of other devices. For example, the functions of the battle module 42 and the data providing module may be performed by the processor 31 of the client terminal 30.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention. For example, it may also be possible that, in the flow diagram shown in FIG. 5, the operations on the control object should be constantly detectable during execution of the game. In this case, the process of step S112 may be inserted between steps S102 and S104, between steps S104 and S106, between steps S106 and S108, or between steps S198 and S110, or may be inserted into these steps as an interrupt. Additionally, the process of step S120 may be inserted between steps S114 and S116 or between steps S116 and S118, or may be inserted into these steps as an interrupt. Also, it may also be possible that the switching operation from manual mode to automatic mode can be done only at a particular timing (e.g., a timing when an instruction to the player units can be received), while the switching operation from automatic mode to manual mode can be done at any desired timing. For example, it may be possible that, in manual mode, the control object 84 should be activated only at the particular timing such that an operation on the control object 84 at a timing other than the particular timing triggers no processing corresponding to the operation. This may enable simple switching operations and instructions to the player units at appropriate timings.

LIST OF REFERENCE NUMBERS

10 server
11, 31 processor
15, 25, 35 storage
30 client terminal
41 game control module
42 battle module
43 data providing module
51 game module
52 display module
53 mode transition module
54 reception module
55 sending module
56 presentation module
57 termination process module

What is claimed is:

1. A game system for providing a game to terminal devices of players, the game system comprising:
   one or more processors configured to execute computer programs;
   memory storage configured to store machine readable instructions, when executed, causing the one or more processors to execute the game for providing the game to the terminal devices such that a plurality of player units battle with a plurality of non-player units in either a manual mode or an automatic mode in the game,
   wherein providing the game to the terminal devices comprises:
      displaying a control object on a touch screen provided to a client terminal device;
      switching the game from the manual mode to the automatic mode when a first operation is performed on the control object in the manual mode and configured to switch the game from the automatic mode to the manual mode when a second operation is performed on the control object in the automatic mode; and
      presenting, to a player, battle scene information indicating a battle scene between the plurality of player units and the plurality of non-player units, and
   wherein in the manual mode, the battle scene information is presented when a third operation is performed on the control object, whereas in the automatic mode, the battle scene information is presented independently of the operation on the control object.

2. The game system of claim 1, wherein providing the game further comprises
   receiving an instruction to at least one of the plurality of player units, such that a battle process between the plurality of player units and the plurality of non-player units is performed based on the instruction and predetermined battle logic; and
   generating, in the manual mode, the battle scene information based on first battle log information indicating a result of the battle process performed in the manual mode.

3. The game system of claim 2, wherein in the automatic mode, a battle process between the plurality of player units and the plurality of non-player units is performed based on the battle logic and independently of the instruction; and
   in the automatic mode, the battle scene information is based on second battle log information indicating a result of the battle process performed in the automatic mode.

4. The game system of claim 1 wherein the third operation is different from the first operation on the control object.

5. The game system of claim 4 wherein the third operation includes contact with the control object displayed on the touch screen for a predetermined period of time, and the first operation includes contact with the control object for a period longer than the predetermined period of time.

6. The game system of claim 1 wherein in the automatic mode, the control object is displayed on the touch screen so as to indicate that the game is in the automatic mode.

7. The game system of claim 1, wherein the battle between the plurality of player units and the plurality of non-player units includes a first battle and a second battle subsequent to the first battle,
   the game system further comprising a termination process module configured to determine, in the manual mode, to start the second battle in accordance with selection by the player after the first battle is terminated and configured to determine, in the automatic mode, whether to start the second battle independently of selection by the player after the first battle is terminated.

8. The game system of claim 7 wherein the first battle involve a specific non-player unit among the plurality of non-player units, and the second battle does not involve the specific non-player unit.

9. The game system of claim 7 wherein the second battle is not started in the automatic mode.

10. The game system of claim 1, wherein on the touch screen, an image related to the battle scene between the plurality of player units and the plurality of non-player units is displayed, thereby to present the battle scene information to the player.

11. A non-transitory computer readable medium comprising a game program for providing a game in which a plurality of player units battle with a plurality of non-player units in either manual mode or automatic mode,
   the game program, when executed by a computer causing a computer to perform:
      display a control object on a touch screen provided to a client terminal;
      to switch the game from the manual mode to the automatic mode when a first operation is performed on the control object in the manual mode and configured to switch the game from the automatic mode to the manual mode when a second operation is performed on the control object in the automatic mode; and
      present, to a player, a battle scene information indicating a battle scene between the plurality of player units and the plurality of non-player units,
      the presentation unit presents the battle scene information when a third operation is performed on the control object,
   whereas in the automatic mode, the presentation module presents the battle scene information independently of the operation on the control object.

12. A method for providing a game in which a plurality of player units battle with a plurality of non-player units in either manual mode or automatic mode, the method being electronically executed by a game system for providing the game to terminal devices of players, the method comprising:
- displaying a control object on a touch screen provided to a client terminal device;
- switching the game from the manual mode to the automatic mode when a first operation is performed on the control object in the manual mode and switching the game from the automatic mode to the manual mode when a second operation is performed on the control object in the automatic mode; and
- presenting, to a player, a battle scene information indicating a battle scene between the plurality of player units and the plurality of non-player units,
- wherein in the manual mode, the battle scene information is presented when a third operation is performed on the control object, whereas in the automatic mode, the battle scene information is presented independently of the operation on the control object.

* * * * *